(12) United States Patent
Kolbenschlag

(10) Patent No.: US 10,767,665 B2
(45) Date of Patent: Sep. 8, 2020

(54) PNEUMATIC VALVE ARRANGEMENT

(71) Applicant: SAMSON AKTIENGESELLSCHAFT, Frankfurt (DE)

(72) Inventor: Stefan Kolbenschlag, Darmstadt (DE)

(73) Assignee: SAMSON AKTIENGESELLSCHAFT, Frankfurt (DE)

(*) Notice: Subject to any disclaimer, the term of this patent is extended or adjusted under 35 U.S.C. 154(b) by 147 days.

(21) Appl. No.: 15/941,518

(22) Filed: Mar. 30, 2018

(65) Prior Publication Data

US 2018/0283409 A1  Oct. 4, 2018

(30) Foreign Application Priority Data

Mar. 30, 2017  (DE) .......................... 10 2017 106 859

(51) Int. Cl.
*F16K 31/52* (2006.01)
*F16K 31/06* (2006.01)
(Continued)

(52) U.S. Cl.
CPC .............. *F15B 5/003* (2013.01); *F15B 13/04* (2013.01); *F15B 13/0442* (2013.01);
(Continued)

(58) Field of Classification Search
CPC ... Y10T 137/86879; Y10T 137/87169–87241; Y10T 137/87772;
(Continued)

(56) References Cited

U.S. PATENT DOCUMENTS 3,991,788 A * 11/1976 Kull .................. F16K 31/10
  137/863
4,338,966 A *  7/1982 Smith ............... F16H 61/0251
  137/596.1
(Continued)

FOREIGN PATENT DOCUMENTS

DE  3342951 A1  6/1985
DE  19718408 A1  11/1998
(Continued)

*Primary Examiner* — Matthew W Jellett
(74) *Attorney, Agent, or Firm* — Schiff Hardin LLP

(57) ABSTRACT

A pneumatic valve arrangement for a pneumatically operated field device, such as a control device, of a processing plant, such as a chemical plant, a foodstuff processing plant, a power plant or the like is disclosed. The valve arrangement may include an air supply conduit for receiving pressurized air from a source of pressurized air, a control air conduit for aerating and venting a pneumatic actor of the field device, and a venting conduit for discharging pressurized air to a pressure sink, such as the atmosphere; a venting valve for opening and/or closing the venting conduit and an aerating valve for opening and/or closing the air supply conduit; and a pivotable carrier lever for common actuation of the aerating valve and of the venting valve, wherein the carrier lever holds the venting valve in its closed position while it opens the aerating valve from its closed position.

17 Claims, 5 Drawing Sheets

(51) Int. Cl.
*B60T 15/02* (2006.01)
*F15B 5/00* (2006.01)
*F16K 11/16* (2006.01)
*F16K 31/10* (2006.01)
*F16K 11/18* (2006.01)
*F15B 13/044* (2006.01)
*F15B 13/04* (2006.01)
*G05D 16/16* (2006.01)
*B60T 8/36* (2006.01)

(52) U.S. Cl.
CPC .......... *F16K 11/161* (2013.01); *F16K 11/185* (2013.01); *F16K 31/0624* (2013.01); *F16K 31/0682* (2013.01); *F16K 31/10* (2013.01); *F16K 31/52* (2013.01); *G05D 16/16* (2013.01); *B60T 8/362* (2013.01); *B60T 8/3625* (2013.01); *B60T 15/027* (2013.01); *F15B 5/006* (2013.01); *F15B 2013/0412* (2013.01); *Y10T 137/87233* (2015.04); *Y10T 137/87756* (2015.04); *Y10T 137/87772* (2015.04)

(58) Field of Classification Search
CPC .......... Y10T 137/87756; F16K 11/105; F16K 11/185; F16K 31/10; F16K 31/52; F16K 31/0624; F16K 31/0682; F15B 5/003; F15B 5/006; F15B 13/04; F15B 13/0442; F15B 2013/0412; G05D 16/16; B60T 8/362; B60T 8/3625; B60T 15/027

USPC ................ 251/129.19, 129.2, 231–247, 368; 137/82, 85, 596, 596.1, 625.48, 868, 870; 303/119.2
See application file for complete search history.

(56) References Cited

U.S. PATENT DOCUMENTS

| | | | | |
|---|---|---|---|---|
| 4,527,590 | A | * 7/1985 | Kolze | ............... F16K 31/10 |
| | | | | 137/596.17 |
| 4,617,969 | A | 10/1986 | Weiger et al. | |
| 5,567,023 | A | * 10/1996 | Yoo | ............... B60T 8/364 |
| | | | | 303/119.2 |
| 5,685,337 | A | * 11/1997 | Yoo | ............... B60T 8/36 |
| | | | | 137/596.17 |
| 5,687,765 | A | * 11/1997 | You | ............... B60T 8/364 |
| | | | | 137/627.5 |
| 5,983,941 | A | 11/1999 | Fritz et al. | |
| 6,382,585 | B1 | * 5/2002 | Pubben | ............... F16K 7/17 |
| | | | | 137/630.15 |
| 2003/0070716 | A1 | 4/2003 | Giousouf et al. | |

FOREIGN PATENT DOCUMENTS

| | | |
|---|---|---|
| EP | 1306598 A1 | 5/2003 |
| WO | 2006/037598 A1 | 4/2006 |

\* cited by examiner

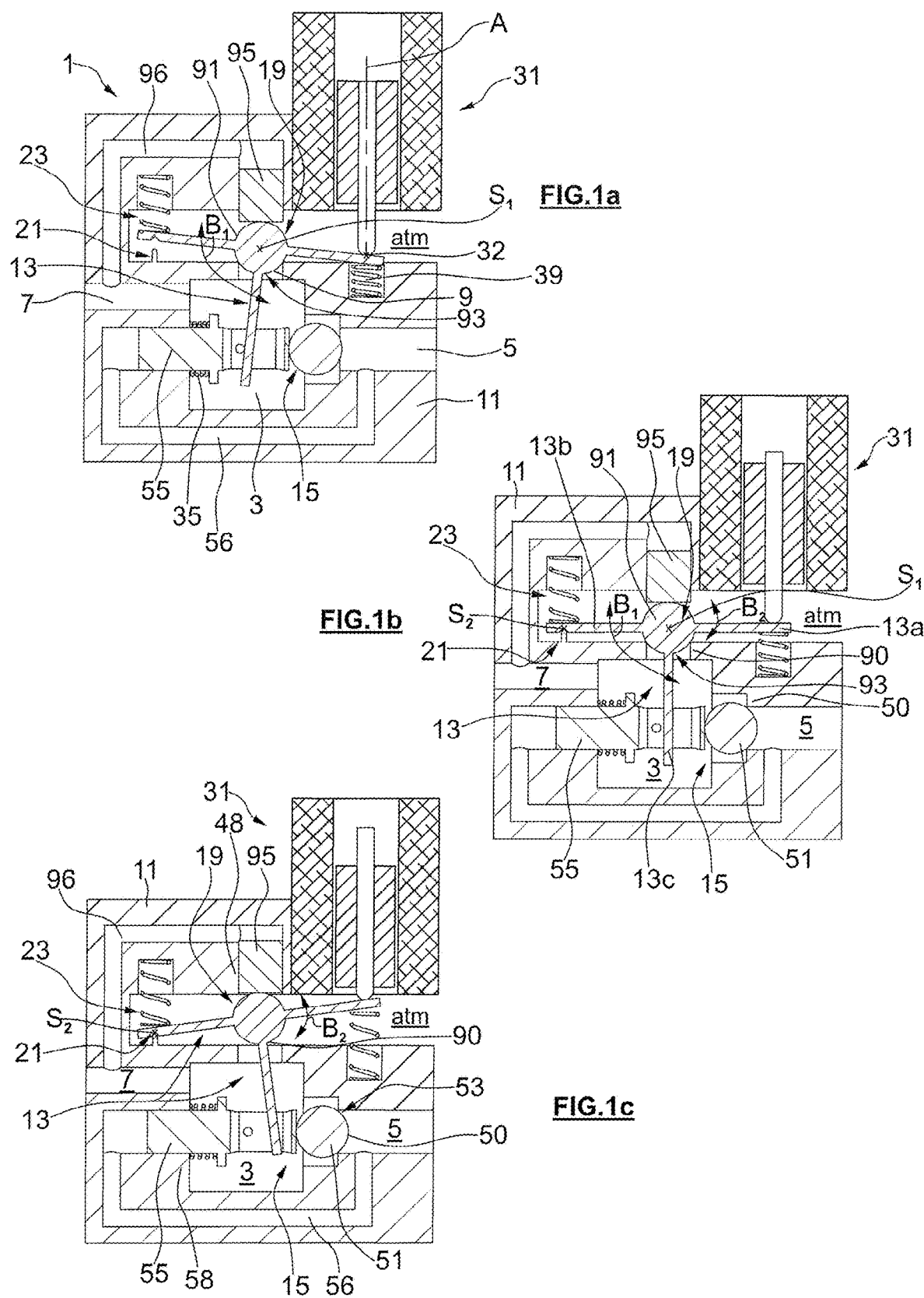

PNEUMATIC VALVE ARRANGEMENT

CROSS REFERENCE TO RELATED APPLICATIONS

This patent application claims priority to German Patent Application No. 10 2017 106 859.7, filed Mar. 30, 2017, which is incorporated herein by reference in its entirety.

BACKGROUND

The disclosure relates to a pneumatic valve arrangement for a pneumatically operated field device, in particular a control device, of a processing plant, such as a chemical plant, a foodstuff processing plant, a power plant or the like.

Pneumatic valve arrangements comprise an air supply conduit for receiving pressurized air from a source of pressurized air, a control air conduit for aerating and venting a pneumatic actor such as a pneumatic actuating drive (e.g., a pneumatic linear actuating drive with spring return or a dual action pneumatic actuating drive of the field device), and a venting conduit for discharging pressurized air to a pressure sink, such as the atmosphere. In known pneumatic valve arrangements, the fluidic connection between the three air channels, that is to say the air supply conduit, the control air conduit, and the venting conduit, is controlled by at least one air control valve, so that pressurized air can be supplied from the source of pressurized air to the pneumatic actor of the field device, or discharged to the pressure sink in a controlled manner.

A pneumatic valve arrangement which has enjoyed great popularity for years is known, for example, from German patent application no. DE 195 05 233 A1. This known pneumatic valve arrangement comprises a housing and a fluid chamber that is conformed inside the housing, into which one fluid inlet conduit opens and from which two fluid outlet conduits depart. One of these leads to a pressure sink and the other to a pneumatic actor of a pneumatic field device. An electromagnet is provided in the pneumatic valve arrangement and actuates a spring-biased hinged armature to move the hinged armature between a position in which the conduit opening of the fluid inlet conduit is closed, and a position in which the conduit opening of the fluid outlet conduit leading to the pressure sink is closed.

A further popular pneumatic valve arrangement is known, for example, from German patent application no. DE 10 2007 062 207 A1. This pneumatic valve arrangement may be embodied as a pneumatic booster for displacing an actuating fitting of a processing plant. The pneumatic valve arrangement comprises a connecting line for sending an amplified pneumatic output signal to an actuating fitting or a pneumatic actor. The connecting line is provided between an air infeed valve and an air discharge valve. A pilot signal for a pneumatic actuating drive, which has been amplified by a pneumatic supply system, may be specified for the connecting line through the air infeed valve. The connecting line may be set to atmospheric pressure through the air discharge valve. The air infeed and air discharge valves are each equipped with a pneumatically controlled tappet, which are actuated with a pneumatic pilot signal. In order to produce the pneumatic pilot signal, pressurized air is tapped from the pneumatic supply system upstream of the air infeed valve via a throttle, and the pneumatic pilot signal is set for the air infeed valve and the air discharge valve by adjusting a discharge air control baffle plate.

More and more users are expressing the desire for both electrically and pneumatically highly energy-efficient pneumatic valve arrangements.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1a shows a schematic cross-sectional view of a first version of a pneumatic valve arrangement in an aerating condition, according to an embodiment;

FIG. 1b shows the pneumatic valve arrangement of FIG. 1a in a pressure-constant holding condition, according to an embodiment;

FIG. 1c shows the pneumatic valve arrangement of FIG. 1a in a venting condition, according to an embodiment;

Figure 2A:
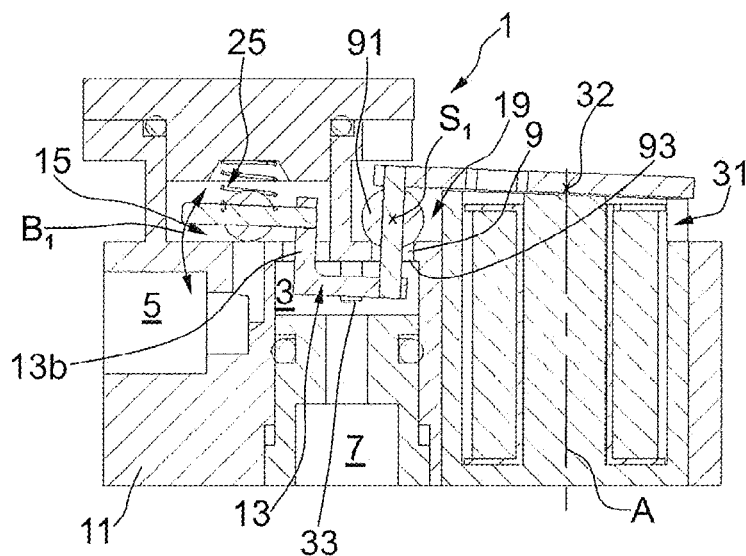
FIG. 2a shows a schematic cross-sectional view of a pneumatic valve arrangement in an aerating condition, according to an embodiment.

The exemplary embodiments of the present disclosure will be described with reference to the accompanying drawings. In the drawings, the same or similar reference signs are used for identical or similar components.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to provide a highly energy-efficient pneumatic valve arrangement that still meets the stringent requirements that apply for positioning accuracy and safety.

Accordingly, a pneumatic valve arrangement is provided for a pneumatically operated field device, in particular a control device, of a processing plant such as, for example, a chemical plant, a petrochemical plant, a foodstuff processing plant, a brewery, a power plant, an atomic power station, etc. The pneumatic valve arrangement according to the disclosure may be implemented as an electropneumatic valve arrangement. The pneumatic valve arrangement comprises an air supply conduit for receiving pressurized air from an air supply source such as a compressor, a pressurized air tank, a pressurized air supply line, or the like. The pneumatic valve arrangement further comprises a control air conduit for aerating and venting an pneumatic actor of the field device, such as a pneumatic actuating drive, particularly a single-action pneumatic linear drive with return spring or a dual action pneumatic actuating drive. The pneumatic valve arrangement further comprises a venting conduit for discharging pressurized air to a pressure sink such as the atmosphere. The pneumatic valve arrangement may include an air chamber into which three air channels open (i.e., the air supply conduit, the control air conduit, and the venting conduit). In an embodiment, the air supply conduit, the control air conduit, and/or the venting conduit may be connected to each other fluidically at least in pairs. The pneumatic valve arrangement according to the disclosure includes a venting valve for opening and/or closing the venting conduit and an aerating valve for opening and/or closing the supply conduit. The venting valve and/or the aerating valve may be implemented as a poppet valve. For instance, two of the air conduits may be equipped with one poppet valve, each for aerating and/or venting the air chamber.

According to an embodiment, the pneumatic valve arrangement comprises a pivotable carrier lever for actuating the aerating valve and the venting valve together, the carrier lever holding the venting valve in its closed position while the carrier lever opens the aerating valve from its closed position. Thus, the pivotable carrier lever is designed to permit or cause an aerating valve opening state, in which the aerating valve assumes an open position in which the air supply conduit is open. In an embodiment, the air supply conduit is open only during a venting valve closed state, in which the venting valve is in the closed position. If the aerating and venting valves are in the form of poppet valves, the pivotable carrier lever may be designed to operate both poppet valves together.

The pneumatic valve arrangement may be constructed so that, with the exception of its air conduits, the air chamber is closed off in airtight manner, such as from the pressurized air supply source and/or the pressure sink. In various embodiments, pressure differences up to 6 bar, up to 10 bar, up to 15 bar, etc., may be realized between the pressure of the pressurized air supply source and that of the pressure sink (e.g., the atmosphere). Due to the pivotable carrier lever holding the venting valve closed when opening the aerating valve, it is ensured that no pressurized air can be discharged to the pressure sink during an inflow process of pressurized air from the supply source. Thus, the discharge of unused pressurized air is prevented or, in other words, all of the pressurized air supplied to the pneumatic valve arrangement is usable for operating the pneumatic actor of the field device. In this way, a very high degree of efficiency and very low energy consumption may be achieved. The pneumatic valve arrangement according to the embodiments described herein may be described as a 3/3-way valve.

While the venting valve is closed, the aerating valve may assume a closed position, or it may open starting from the closed position, in which case an opening cross section of the aerating valve may be steplessly adjustable. The aerating valve may assume various open positions to create a throttle effect, so that a desired volume flow (e.g., a constant flow) may be set from the pressurized air supply source to the control air conduit. In this way, a proportional behavior may be achieved between a control actuating factor (e.g., a solenoid control current from an electromagnetic actor), and the volume flow through the control air conduit for operating the pneumatic actor.

According to an embodiment, the aerating valve and the venting valve are coupled via the carrier lever, which is mounted on the venting valve in the closed position thereof to enable a rotary actuating lever-movement to open the aerating valve. The carrier lever may extend from the aerating valve to the venting valve inside an air chamber into which the air conduits open. The use of such a carrier lever makes it possible to construct the housing of the pneumatic valve arrangement in airtight manner. In particular, the housing of the pneumatic valve arrangement may be constructed without a special opening for the carrier lever. For example, the housing may be constructed without an additional opening solely for the actuating mechanism of the aerating the venting valves.

According to an embodiment, the carrier lever is mounted on a stationary part of a housing of the pneumatic valve arrangement, on the aerating valve, and/or on the venting valve in such manner that the carrier lever rotates around a first pivot axis for the rotational actuating movement for opening the aerating valve. Alternatively or additionally, the carrier lever is mounted on a stationary part of a housing, on the aerating valve, and/or on the venting valve in such manner that the carrier lever rotates around a second pivot axis for a rotational actuating movement for closing the venting valve. The second pivot axis may be different from the first pivot axis. The carrier lever may also be described as a rocker lever. Such a mounting of the carrier lever may permit the carrier lever to execute a rotary movement either about a first pivot axis or about a second pivot axis, which enables a space-saving accommodation of the carrier lever (e.g., on the actuating mechanism, inside the housing of the pneumatic valve arrangement).

According to an embodiment of such a pneumatic valve arrangement, the carrier lever is braced on the aerating valve in the closed position thereof for the rotational actuating movement for opening the venting valve. According to such an embodiment, the carrier lever is braced on a self-aligning bearing mounted immovably on the housing, like a blade, for the rotational actuating movement for opening the venting valve.

According to an embodiment, an elastic biasing means (e.g., a spring), urges the carrier lever against a counter bearing for the rotational actuating movement for closing the venting valve in order to rotatably secure the carrier lever relative to, for example, the second pivot axis about the counter bearing.

According to an embodiment, the rotational actuating movement around the first pivot axis for opening the venting valve releases a safety mechanism associated with the second pivot axis. Alternatively or additionally, the rotational actuating movement around the second pivot axis for closing the venting valve may release the safety mechanism associated with the first pivot axis.

According to an embodiment, which may be combined with other embodiments as described herein, the effective lever length between a respective pivot axis and a force input position of the carrier lever is the same or different for the two actuating movements. The effective lever length from a force input position, at which the force may be input by an actor to actuate the pneumatic valve arrangement, may be shorter to the first pivot axis than the effective lever length from the force input position to the second pivot axis. In this way, it may be ensured that a closing force is provided for closing the venting valves greater than the opening force for opening the aerating valves. Thus, a reliable closing effect may be achieved.

According to an embodiment, which may be combined with other embodiments as described herein, the pneumatic valve arrangement further comprises an actor, such as an electric actor (e.g., a piezo-electric actor or an electromagnetic actor), a pneumatic actor, a hydraulic actor, etc., for operating the pneumatic valve arrangement. In such a case, the carrier lever is operated by the same actor for the two actuator movements. The pneumatic valve arrangement may thus be designed such that the same actor brings about the actuating movement for closing the venting valve and the actuating movement for opening the aerating valve. The force input by the actor for moving the carrier lever for the rotational actuating movement for opening the aerating valve thus acts in a manner that reinforces the closing force applied to the venting valve. This serves to prevent leaking through the closed venting valve when the aerating valve is open.

According to an embodiment, the actor defines a force input position for operating the carrier lever outside of the three air conduits and/or outside an air chamber into which the three air conduits open. The actor may then define the force input position for operating the carrier lever, for example, in the area of the pressure sink, such as the atmosphere. The actor may be mounted outside on a stationary part of the housing of the pneumatic valve arrangement. In order to insert the carrier lever into the area carrying the control air from the pressure sink area, the carrier lever may extend through the venting opening or the venting conduit, which is present in either case.

According to an embodiment, at least a part of the actor, (e.g., a movable part of the actor or all movable parts of the actor) may be arranged inside the housing of the pneumatic valve arrangement, such as inside a compartment of the housing which is sealed off from the outside area. In such an embodiment, the actor defines a force input position for operating the carrier lever within the three air conduits and/or inside the air chamber into which the three conduits open. According to such an embodiment, the actor (i.e., at least the movable parts of the actor) are accommodated inside the housing of the pneumatic valve arrangement in a pneumatically sealed manner so that dynamic seals for supporting movable parts of the actor between, for example, an atmospheric external area and an internal area of the pneumatic valve arrangement carrying pressurized air are not needed.

According to an embodiment, the carrier lever is rigidly connected to a valve member of the aerating valve (e.g., integrally) and/or of the venting valve. Alternatively or additionally, the carrier lever is hingedly connected to a valve member of the aerating valve and/or of the venting valve. The carrier lever may be connected rigidly to the valve member of the venting valve. The carrier lever may be hingedly connected to the valve member of the aerating poppet valve.

According to an embodiment, which may be combined with other embodiments as described herein, the carrier lever is mounted in a fully floating manner relative to the housing of the pneumatic valve arrangement via a guide. For instance, the guide may include at least one pin or at least two pins for internally guiding or externally guiding the carrier lever. The guide may also comprise exactly one or exactly two pins. Alternatively or additionally, the guide may include at least one or two interior side walls of an air chamber into which the three air conduits open. According to an embodiment, a mounting may be formed by two oppositely positioned interior side walls and a pin. With a guide of such kind, a space-saving, secure guide may be provided for the carrier lever which prevents the carrier lever from becoming misaligned, for example.

According to an embodiment of a pneumatic valve arrangement, which may be combined with other embodiments as described herein, the aerating valve and/or the venting valve may include a valve member whose sealing surface is at least partially spherical. The valve member of the aerating valve and/or the valve member of the venting valve may be entirely spherical. Alternatively or additionally, the aerating valve and/or the venting valve may have a valve member whose sealing surface is made of a hardened steel or ceramics. The valve member or valve members may be made of a non-magnetic material. For example, the entire valve member may be made of a non-magnetic material, hardened steel, and/or ceramics.

According to an embodiment, which may be combined with other embodiments as described herein, the pneumatic valve arrangement is designed such that in a non-actuated state (e.g., an electricity-free condition), the aerating valve is closed and the venting valve is open. In this way, safe emergency venting may be assured.

According to an embodiment, which may be combined with other embodiments as described herein the aerating valve and/or the venting valve is/are equipped with pressure-force-compensation means such as a compensation piston. The pressure compensation means may include, for instance, a dynamic seal such as an O-ring or a membrane.

Furthermore, the embodiments described herein relate to a pneumatically operated field device, such as a control device including a pneumatic valve arrangement, wherein the field device further includes a pneumatic actor such as a pneumatic actuating drive (e.g., a pneumatic linear actuating drive such as a single-action pneumatic linear drive with spring return, a dual action pneumatic actuating drive, etc.), which is in pneumatic communication with the control air conduit. If the field device includes a dual action pneumatic actuating drive with a first pneumatic working chamber and a second pneumatic working chamber which are pneumatically separated from each other and have opposite effective directions, the field device may have two pneumatic valve arrangements, of which at least one is designed according to the embodiments described herein. The first working chamber may be connected to the control air conduit of the first pneumatic valve arrangement, and the second pneumatic working chamber may be connected to the control air conduit of the second pneumatic valve arrangement. The pneumatic actuating drive may have at least one pneumatic working chamber with one pneumatic control inlet for increasing and/or lowering pressure, wherein this pneumatic control inlet is connected to the control air conduit of the pneumatic valve arrangement. The field device may further comprise a pneumatic source of pressurized air, such as a pressurized air tank, a compressor, a supply line, etc., which is connected pneumatically to the air supply conduit.

The pneumatic valve arrangement according to the example embodiments shown in the figures is generally designated with reference number 1. It comprises as its main component three air conduits 5, 7, and 9, which are fluidically connected to each other, an air supply conduit 5, a control air conduit 7, and a venting conduit 9. The area in which air conduits 5, 7, and 9 are in connection with each other may be designated air chamber 3. Further main components of the pneumatic valve arrangement according to the embodiments described herein include an aerating valve 15 for opening and/or closing air supply conduit 5, venting valve 19 for opening and/or closing venting conduit 9, and pivotable carrier lever 13, which provides a mechanical coupling between aerating valve 15 and venting valve 19.

The embodiments shown herein implement a common pneumatic operating principle. For instance, housing 11 of pneumatic valve arrangement 1 comprises an aeration conduit or air supply conduit 5, through which pressurized air may flow from a pressurized air supply source (e.g., in the form of a compressor or pressurized air reservoir). Air supply conduit 5 opens into an air chamber 3. A control air conduit 7 and a venting conduit 9 also open into air chamber 3.

Control air conduit 7 is conformed in housing 11 of pneumatic valve-arrangement 1. Control air conduit 7 provides the pneumatic connection between a pneumatic actor (not shown) and the pneumatic valve arrangement. A pneumatic actor may be, for example, a single-action pneumatic linear drive with spring return. Linear drives of such kind include a pneumatic working chamber in which a control pressure or actuating pressure is set, producing a pneumatic actuating force that actuates a control rod or a control shaft of the pneumatic actor. A control valve of a processing plant, for example, may be connected to a control rod or control shaft of a pneumatic actor. The working chamber of the pneumatic actuating drive may have one pneumatic inlet and outlet, through which the working chamber of the pneumatic actor may be aerated or vented. The inlet of a pneumatic actor may be connected to control air conduit 7 of pneumatic valve arrangement 1, so that the pneumatic actor may be aerated or vented by the pneumatic valve arrangement through control air conduit 7. The pneumatic valve arrangement thus serves to supply a pneumatic actor with a precisely determined control pressure or actuating pressure. It is also conceivable that pneumatic valve arrangement 1 may supply a pneumatic actor, e.g. a valve nozzle or a pneumatic motor, with a constant control volume flow. For this purpose, aerating valve 15 may be opened with a predetermined throttling. A pneumatic communication connection between air conduit 3 and a pressure sink (e.g., the atmosphere) may be provided through venting conduit 9.

An aeration poppet valve 15, with which air supply conduit 5 may be opened or closed, is provided in the area of air supply conduit 5. A venting poppet valve 19, with which venting conduit 9 may be opened or closed, is provided in the area of venting conduit 9. When aerating valve 15 is open, pneumatic pressurized air may flow from the pressure supply source (not shown) into air chamber 3 through air supply conduit 5. When venting valve 9 is open, air at a higher pressure than atmospheric pressure is able to escape to the atmosphere atm through venting conduit 9. In an embodiment, control air conduit 7 is designed without valves. Control air conduit 7 provides a pneumatic communication connection between air channel 3 and the pneumatic actor (not shown), so that substantially the same pressure, that is to say the control pressure or the actuating pressure, is present in air chamber 3, control air conduit 7 and the part of the pneumatic actor which is in fluidic connection with control air conduit 7, for example the pneumatic working chamber thereof. With pneumatic valve arrangement 1, this control pressure may be adjusted to precise target pressure values between the pressurized air supply source and the pressure of the pressure sink, for example the atmosphere. The pneumatic valve arrangement 1, that is to say housing 11, may be constructed to function in a substantially airtight sealing manner up to a pressure difference between the pressurized air supply source and the pressurized air sink of at least 6 bar, at least 10 bar, at least 15 bar, etc.

In the example embodiments of a pneumatic valve arrangement 1 represented in FIGS. 1*a* to 4*c*, aerating valve 15 and venting valve 19 are coupled to each other mechanically via a pivotable carrier lever 13. The mechanical coupling of aerating valve 15 and venting valve 19 via pivotable carrier lever 13 may have the effect of creating a switching logic or causal link between the operating states of the aerating valve and the venting valve. The carrier lever 13 has the effect of ensuring that venting valve 19 is in a closed state when aerating valve 15 is in an (even only slightly) open state. For this purpose, carrier lever 13 may be provided to exert an opening and/or closing operating effect on aerating valve 15. In an embodiment, carrier lever 13 may be able to exert an opening operating effect with regard to aerating valve 15 while venting valve 19 is in its closed position.

Carrier lever 13 thus guarantees that a pneumatic operating logic is complied with unfailingly, according to which no state may occur in which air chamber 3 is supplied with pressurized air from the pressurized air supply source through an open aerating valve 15 and pressurized air is discharged into the atmosphere atm through an open venting valve 19 at the same time. On the other hand, carrier lever 13 consistently allows aerating valve 15 and venting valve 19 to assume their closed positions at the same time, so that air chamber 3 is pneumatically separated from both the source of pressurized supply air and the atmosphere atm. Because it is a mechanical element, that is to say carrier lever 13, which maintains the pneumatic effect logic of aerating valve 15 and venting valve 19 for the pneumatic valve arrangement 1, the logical coupling of the states of pneumatic aerating valve 15 and venting valve 19 does not require any additional electrical and/or pneumatic energy.

The following text discusses in detail the various actuation states of the example embodiments of a pneumatic valve arrangement 1 represented in FIGS. 1*a*, 1*b* and 1*c*. The aerating valve 15 represented in FIGS. 1*a*, 1*b* and 1*c* may be implemented as an aerating poppet valve. Aerating poppet valve 15 comprises a movable valve member 51 implemented as a sphere made from a very hard (e.g., a non-metallic material such as ceramic or hardened, non-magnetic, steel). As is illustrated in FIGS. 1*b* and 1*c*, the ball-shaped valve member 51 of aerating valve 15 is in circumferential, annular closed contact with valve seat 50, which is formed in the area of the opening of air supply conduit 5 in air chamber 3.

Valve member 51 is urged into the closed position by a piston 55, which is spring-biased by a restoring spring 35. Piston 55 also functions as a compensation piston. For this purpose, when a compensation conduit 56 is present the supply pressure from the pressurized air supply source present in supply conduit 5 is applied to the farthest side of piston 55. Accordingly, in the closed state of aerating valve 15 as shown in FIGS. 1b and 1c, the same supply pressure that acts on valve ball 51 in the opening direction also acts in the opposite effective direction on compensation piston 55, pressing valve member 51 into its closed position. Since the surface area of compensation piston 55 and the surface area of valve member 51 exposed to the supply pressure are approximately the same size, any pneumatic opening force on valve member 51 is nevertheless compensated due to a possible difference between the pressures of the pressurized air supply source and the air in air chamber 3. In various embodiments, the diameter of valve seat 15 may be between 1 mm and 10 mm, such as between 3 mm and 5 mm, for example. For sealing in the area between housing 11 and compensation piston 55, a membrane may be provided as a dynamic seal 58, so that no pressurized air is able to flow along compensation piston 55 into air chamber 3 from the pressurized air supply source. Membranes also have the advantage of very low friction. As shown in FIGS. 1a to 1c, a depressurized aerating valve 15 can be held in the closed position merely by the closing effect of restoring spring 35. The pressing force on valve seat 5 is only dependent on restoring spring 35, which may be of very small size because of the pressure relief.

Venting valve 19 may be equipped with a pressure relief piston or compensation piston 95. Compensation piston 95 of venting valve 9 is arranged opposite valve seat 90. The pneumatic effective surface of compensation pistons 95 and valve member 91 of venting valve 19 are almost of the same size, with the result that the pressure gradient between air chamber 3 and the pressure sink or the atmosphere atm may be completely compensated. A compensation conduit 96 is provided in valve housing 11, which creates a pneumatic operative connection between air chamber 3 and control air conduit 7 pneumatically and the compensation piston 95 arranged opposite valve seat 90.

The closing (or opening) force acting on valve member 91 of venting valve 19 results from the actuating force generated by an actor 31, the spring force of restoring spring 35, which is exerted counter to the actor, and any force exerted by spring 23.

FIG. 1c shows the pneumatic valve arrangement 1 with open venting valve 19. As shown in FIGS. 1a to 1c, valve member 91 is constructed as a single part with a T-shaped carrier lever 13. Alternatively, valve member 91 may also be connected in non-rotating manner with a T-shaped carrier lever 13. In the open position (FIG. 1c), carrier lever 13 is pivoted out of the closed position (FIG. 1b) about a (second) pivot axis $S_2$. The pivoting of valve member 91 is brought about by the force of restoring spring 39, which acts on an operating leg 13a (or lever arm) of T-shaped carrier lever 13. In the open state of venting valve 19, actor 31, which is embodied in FIG. 1 as an electromagnetic linear drive, may be inactive (e.g., de-energized). When actor 31 is activated, a closing force may be applied to carrier lever 13, which acts in the opposite direction to restoring spring 39 and should be at least as great as the effective opening force of restoring spring 39 in order to bring about the closing of valve seat 90 with valve member 91. In the example embodiment represented to FIGS. 1a, 1b and 1c, the effective axes of actor 31 and actor axis A and the effective direction of restoring spring 39 are aligned co-linearly with each other and act on the same force input position 32, which is located in the area of the atmosphere atm.

It is known that the force of a spring such as restoring spring 39 results approximately from the product of an elastic spring constant k and the deformation of the change in length of the spring. Therefore, in order to move carrier lever 13 (and therewith valve member 91 of venting valve 91) towards its closed position (FIGS. 1a, 1b), a proportionally increasing force against the return force of restoring spring 39 should be applied to carrier lever 13 by actor 31. In this way, a sudden change of the position of valve members 91 is advantageously avoided.

When valve member 91 is moved from its fully open position (FIG. 1c) to its closed position (FIG. 1b), carrier lever 13 moves rotationally in a (second) actuating direction $B_2$ about the second pivot axis $S_2$. Pivot axis $S_2$ is defined by a blade 21 on housing 11, which engages a notch on one leg end 13b of carrier lever 13. A forcing means in the form of a spring 23 presses carrier lever 13 into this pivoted position. In the closed state of venting valve 19 shown in FIG. 1b, an approximate equilibrium exists between the force of actor 31 and the return force of restoring spring 39. As explained earlier, the pressure gradient between the atmosphere atm and air chamber 3 consequently exerts almost no force or a balanced force on valve member 91, because the same pressure gradient acts on compensation piston 95 in the opposite direction thereto. Piston 95 is equipped with a membrane seal 98 sealing it against housing 11.

In the example embodiment represented by FIGS. 1a to 1c, carrier lever 13 is embodied as a T-shaped body connected in non-rotational manner to valve member 91, and having lever arms and legs 13a, 13b and 13c.

In the state represented in FIG. 1b, both venting valve 19 and aerating valve 15 are closed. Starting from this state, venting valve 19 may be pivoted back in the (second) actuation direction $B_2$ about the (second) pivot axis $S_2$ to release valve seat 90. The effective sealing surface 93 of valve member 91, which is in sealing contact with valve seat 19, may be spherical, as shown here.

If actor 31 (starting from the closed state as shown in FIG. 1b) further applies actuating or closing force to actuating lever arm 13a at force input position 32, carrier lever 13 moves in a (first) actuating direction $B_1$ about a (first) pivot axis $S_1$, which is defined by the center of rotation of spherical valve member 91, as shown in FIGS. 1a and 1b. Valve member 91 rotates with its effective (i.e., at least partially spherical sealing surface 91) in valve seat 90. Counter-support lever arm 13b is then lifted off of the blade 21 on housing 11 of the valve arrangement 1 against the retaining force of spring 23. Both the retaining force of spring 23 and the actuating force of actor 31 act a mutually reinforcing closing forces with respect to venting valve 19.

As a result of the rotational actuating movement $B_1$ about the first pivot axis $S_1$ defined by venting valve member 91, the middle lever arm 13c of T-shaped carrier lever 13, which projects downwards into air chamber 3, now comes into detachable supporting contact with aerating valve 15. Bottom lever arm 13c of carrier lever 13 displaces compensation piston 55 away from aerating valve member 51. As the pressure compensation at aerating valve member 51 diminishes, the pressure gradient between the pressure of the pressurized air supply source or the air supply conduit 5 and the actuating pressure in air chamber 3 is now able to exert a pressing force to open valve member 51, which force detaches valve member 51 from the sealing connection with valve seat 50. In this way, aerating valve 15 may be opened by means of actor 31, as is shown in FIG. 1a. A lever length corresponding substantially to the length of actor-lever arm 13a is available to actor 31 for the first actuating movement $B_1$ about first pivot axis $S_1$. For actuating movement $B_2$ about the second pivot axis $S_2$, the lever length available to actor 31 substantially corresponds to the cumulative length of both upper lever arms 13a and 13b.

A lateral guide of the lower lever arm 13c of carrier lever 13 in piston 55, or a guide (not shown in greater detail) for one of the two upper lever arms 13a, 13b of carrier lever 13 may be provided in the external area of pneumatic valve arrangement 1, which is filled with atmospheric air, to prevent carrier lever 13 from being tilted in a direction that does not correspond to a rotation about at least of the pivot axes $S_1$ or $S_2$.

Figure 2B:
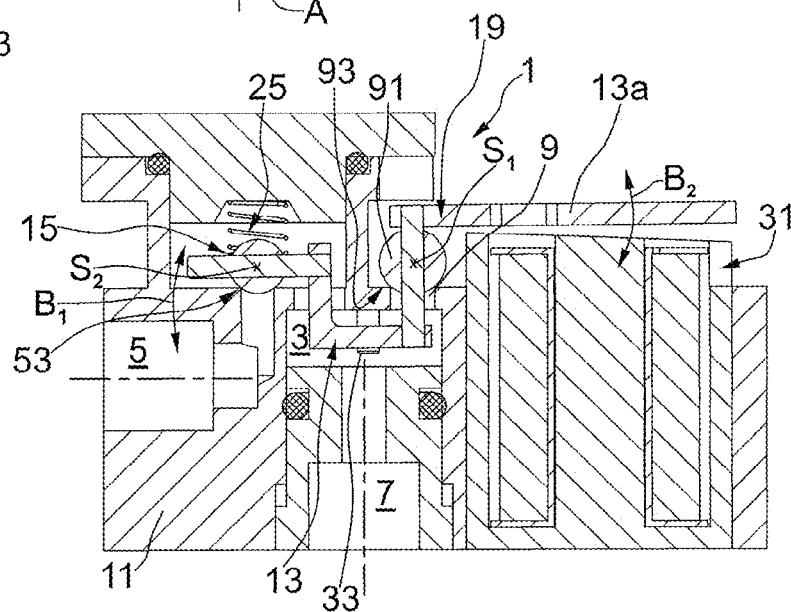
FIG. 2b shows the pneumatic valve arrangement of FIG. 2a in a pressure-constant holding condition, according to an embodiment.
Figure 2C:
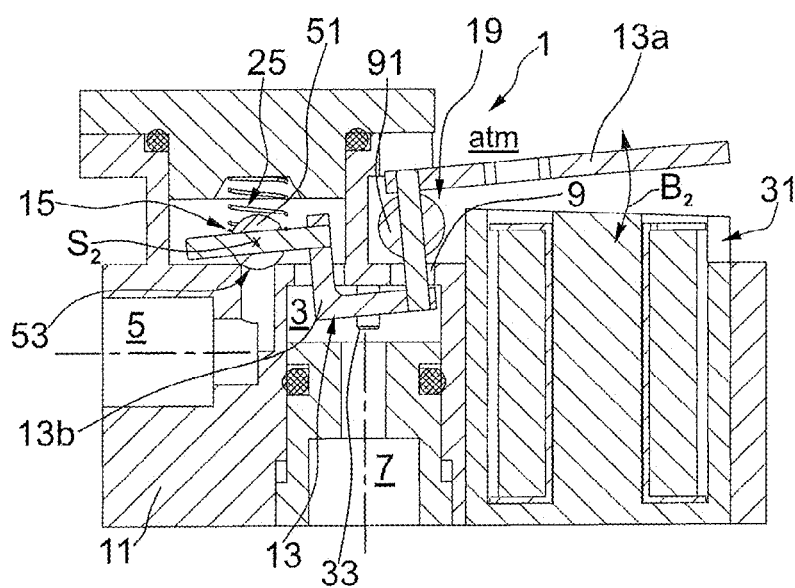
FIG. 2c shows the pneumatic valve arrangement of FIG. 2a in a venting condition, according to an embodiment.

The following text discusses in detail the embodiments of a pneumatic valve arrangement as represented in FIGS. 2a, 2b and 2c. The design of the pneumatic valve arrangement 1 represented in FIGS. 2a to 2c is mechanically different from the embodiments discussed with reference to FIGS. 1a to 1c, but in pneumatic terms it has the same functionality. The basic mechanical structure of the valve arrangement 1 according to FIGS. 2a to 2c does not include the compensation piston included in valve arrangement 1. The venting valve 19 of FIG. 2 does not have a return spring. Spring 25 of the aerating valve functions both as a retaining spring and as a return control spring, as will be described hereafter. Actuating actor 31 or valve arrangement actor acts directly on carrier lever 13 without an additional movable actor. For this purpose, in the embodiment of FIGS. 2a to 2c, carrier lever 13 may be at least partly ferromagnetic (e.g., completely ferromagnetic, having a section which is made of a ferromagnetic material, furnished with a lining made of a ferromagnetic material, etc.). For example, carrier lever 13 may be equipped with permanent magnets at force input position 32, so that actor 31 may optionally exert an attractive actuating force, no actuating force, or a repelling actuating force on carrier lever 13.

The at least partly ferromagnetic section of carrier lever 13 may be constructed in a section of lever arm 13a that is bisected by the effective axis A of actor 31, which is in this case is electromagnetic. The force input position 32 at which force from actor 31 is applied to the carrier lever 13 is defined by the intersection point between axis A and carrier lever 13. In the example embodiment shown in FIGS. 2a to 2c, carrier lever 13 is made up of several (e.g., four component parts). Using four component parts as an example, two of which may extend through a respective closing ball or one valve body 91, 51, each of venting valve 19 or aerating valve 15. The sections of carrier lever 13 that extend through one of the two ball valve members 91 or 51 create a non-rotational connection between carrier lever 13 and the two valve members 15 and 19. Alternatively, it is also conceivable that carrier lever 13 and one or both valve members 51, 91 are formed integrally as a single part.

FIG. 2a shows the valve arrangement 1 with open aerating valve 15 and closed venting valve 19. In order to move aerating valve 15 from its closed position as shown in FIG. 2b in the first actuating direction $B_1$ about the first pivot axis $S_1$, actor 31—in this case electromagnetic—is activated and exerts an attractive actuating force on the ferromagnetic part of carrier lever 13. The actuating force of actor 31 on carrier lever 13 lifts valve member 51 away from valve seat 50 on housing 11 of the pneumatic valve arrangement 1 against the return force of spring 25. When the actuating force of actor 31 is reduced, the return force of the spring 25 of valve member 51 and of aerating valve 15 may again come into closing engagement with valve seat 50. The return force of spring 25 then pivots the aerating valve member 51 about the first pivot axis $S_1$ in first actuating direction $B_1$, until it moves from an open position into a closed position.

The first pivot axis $S_1$ is defined by the center of rotation of the spherical closing surface 93 of the spherical valve member 91 of venting valve 19. Carrier lever 13 extends through the body of ball valve member 91 from the pressure sink side towards the control pressure side. As a variable actor force causes a gradual pivoting of carrier lever 13 about the first pivot axis $S_1$, a gradual, steplessly adjustable, actuating movement $B_1$ of the aerating valve 15 about the first pivot axis $S_1$ can take place with venting valve 19 closed. In this way, a constant actuating pressure or a constant control volume flow from the pressurized air supply conduit 5 to the control air conduit 7 and from there to the pneumatic actor (not shown) may be set depending on the type of pneumatic actor which is connected to control air conduit 7.

If the force of actor 31 of pneumatic valve arrangement 1 is reduced from the constant retaining state represented in FIG. 2b, the actuating pressure in air chamber 3 is able to lift the venting valve 19 of valve member 91 from its valve seat 90 on housing 11, with the result that pressurized air escapes from air chamber 3 and the control air conduit 7 that opens into it, and from the pneumatic actor (not shown) connected to control air conduit 7 to the pressure sink, such as the atmosphere. In order to lift valve member 91 of venting valve 19 off the valve seat 90, lever 13 pivots in a second actuating direction $B_2$ about the second pivot axis $S_2$. The second pivot axis $S_2$ is defined by the at least partially spherical sealing surface 53 of ball valve member 51 of aerating valve 15, with which ball valve member 51 is in sealing touching contact with the valve seat 50 on housing 11. A pin 33 is attached non-movably to the housing and protrudes through an opening (not shown) in the carrier levers 13 to guide lever arm 13 inside air chamber 3.

Similarly to the example embodiment represented in FIGS. 1a to 1c, the effective lever effect applied by carrier lever 13 to move lever 13 in the second actuating direction $B_2$ about second pivot axis $S_2$, that is to say to close venting valve 19, is equal to the combined lengths of lever arms 13a, 13b between the second pivot axis $S_2$ and force input position 32. In order to pivot carrier lever 13 about the first pivot axis $S_1$ as described above, an effective lever length equal to the first lever arm 13a between pivot axis $S_1$ and force input position 32 is available to the actor (FIG. 2a). Starting from the first pivot axis $S_1$, the effective lever length of actor lever 13a is approximately the same size as the effective lever length of the aerating valve opening arm 13b (13c in FIG. 1).

Figure 3A:
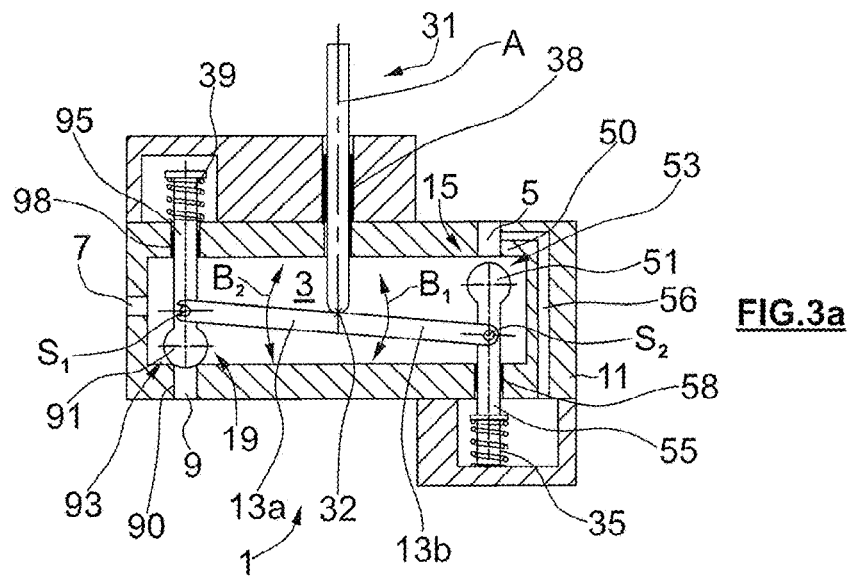
FIG. 3a shows a schematic cross-sectional view of a pneumatic valve arrangement in an aerating condition, according to an embodiment.
Figure 3B:
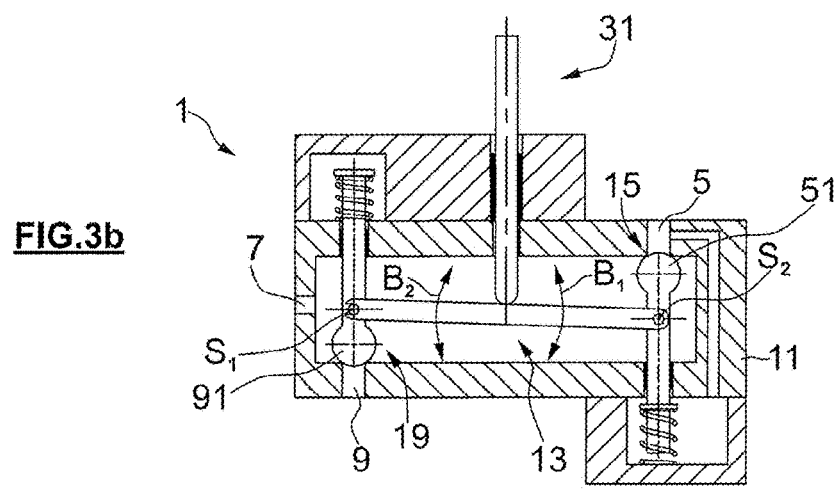
FIG. 3b shows the pneumatic valve arrangement of FIG. 3a in a pressure-constant holding condition, according to an embodiment.
Figure 3C:
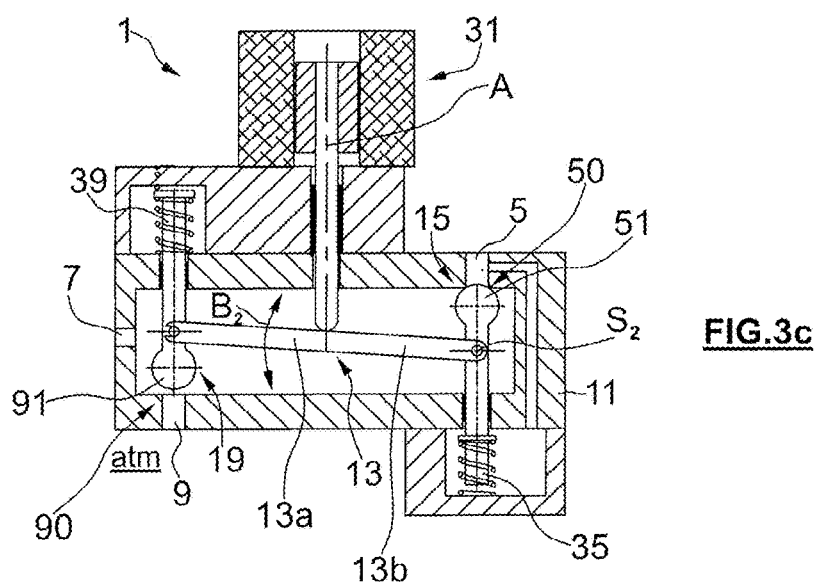
FIG. 3c shows the pneumatic valve arrangement of FIG. 3a in a venting condition, according to an embodiment.

The following text discusses in detail the example embodiments of a pneumatic valve arrangement 1 as represented in FIGS. 3a, 3b and 3c. The design illustrated in FIGS. 3a to 3c differs from those FIGS. 1a to 1c and 2a to 2c mainly in that carrier lever 13 is arranged entirely inside air chamber 3. Moreover, in the embodiments represented in FIGS. 3a to 3c, carrier lever 13 is not connected in non-rotational manner to any of the valve members 51, 91.

As shown in FIG. 3c, actor 31 of the pneumatic valve arrangement (as in the embodiment represented in FIG. 1) may be embodied as an electromagnetic actor with a control rod. It is also conceivable that actor 31 is embodied as a pneumatic or hydraulic actor, with a control rod, for example. It is also conceivable that actor 31 or at least the movable part of the actor, that is to say the control rod, is arranged entirely inside the housing that holds the control air, for example inside control air chamber 3. In such a case, the dynamic seal 38 on the control rod may not be needed. The dynamic seal 38 may be in the form of a membrane or an O-ring for example.

In FIGS. 3a to 3c, aerating valve 15 and venting valve 19 are designed as linearly movable poppet valves with a piston 55 or 95. A valve member 51 or 91 is attached to a frontal face of the respective piston 55 or 95. As shown, valve member 51 or 91 may have a partially spherical sealing surface 53 or 93, although this is by way of example and not by limitation, as other geometries are conceivable.

As is illustrated clearly for the aerating valve 15 of FIGS. 3a to 3c, piston 55 may be de-pressurized by supporting the foot end of piston 55 in a compensating chamber, which is connected pneumatically to air supply conduit 5 via a compensation conduit 56. Venting piston 95 may also be embodied as a de-pressurized piston, by routing a compensation conduit 96 (not shown in detail) from the pressure sink or the venting conduit to the foot end of the venting piston 95.

A dynamic seal 58 or 98 is provided between the chambers that are arranged at the foot end of piston 55 or 95, and the air chamber 3 to prevent streams of leaking pressurized air along piston 55, 95.

Venting valve 19 has a restoring spring 39 which biases venting piston 95 in the direction of the open venting valve position shown in FIG. 3c. Aerating valve 15 has a restoring spring 35 which also biases aerating valve 15 towards the closed position of aerating valve 15, which is also shown in FIG. 3c. As shown in FIG. 3c, actor 31 may be designed for a passive (e.g., currentless state) such as an emergency venting state, for example.

Starting from the pressure reduction state shown in FIG. 3c, in which pressurized air may be discharged to the atmosphere from control air conduit 7 through pressure chamber 3 and venting conduit 9, valve arrangement 1 may be actuated to switch from the holding state shown in FIG. 3b to the pressurization state shown in FIG. 3a. For this purpose, actor 31 is actuated to exert an actuating force along actor axis A with the actor rod, which forces acts on carrier lever 13 at force input position 32.

Carrier lever 13 is attached to both aerating valve 15 and venting valve 19 in articulated manner to enable rotation. For the second actuating movement direction $B_2$ and the second pivot axis $S_2$, which is supported on aerating valve 15 in the closed position thereof, carrier lever 13 may now be pivoted. When carrier lever 13 is then pivoted in the second actuating movement direction $B_2$ about the second pivot axis $S_2$, carrier lever 13 takes venting valve 19 with it.

If lever arms 13a and 13b between force input position 32 and the pivot points $S_1$ on venting valve 19 and pivot point $S_2$ on aerating valve 15 are substantially the same size, as in the example represented in FIGS. 3a to 3c, the return force in the venting restoring spring 39 is smaller than the return force in the aerating restoring spring 35, to ensure that actuation of carrier lever 13 by actor 31 leaves aerating valve 15 in the closed state, and only venting valve 19 moves in actuating direction $B_2$ to its closed position. Alternatively or in addition to adjusting springs 35, 39 of various strengths, embodiments include the implementation of different lengths of lever arms 13a, 13b for the force input position.

In order to close venting valve 19, actor 31 pivots carrier lever 13 about pivot axis $S_2$ which is associated immovably with the closed aerating valve 15, until venting valve 19 assumes its closed position, as shown in FIG. 3b. If the actuating force of actor 31 is increased further, carrier lever 13 then begins to move in the first actuating movement direction $B_1$ about first pivot axis $S_1$. First pivot axis $S_1$ is associated immovably with the closed venting valve 19. If actor 31 continues to pivot carrier lever 13 further from the state as shown in FIG. 3b, actor 31 increases the closing force on venting valve 19 and via carrier lever 13 presses on the pivot point $S_2$ on aerating valve 15 against restoring spring 35 of aerating valve 15. In this way, aerating valve 15 may be opened, as illustrated in FIG. 3a.

Figure 4A:
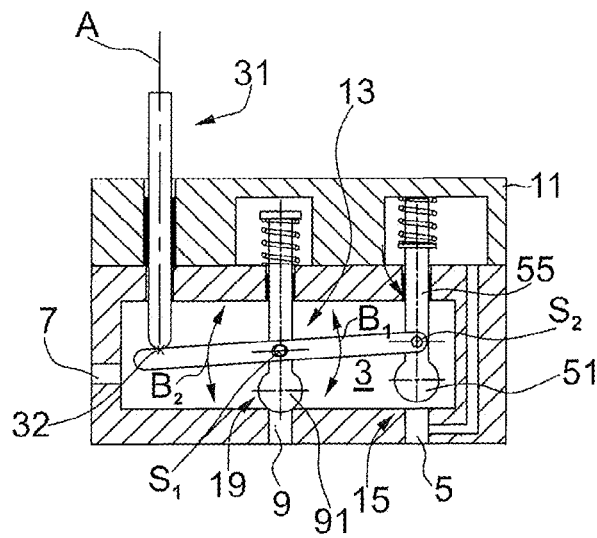
FIG. 4a shows a schematic cross-sectional view of a pneumatic valve arrangement in an aerating condition, according to an embodiment.
Figure 4B:
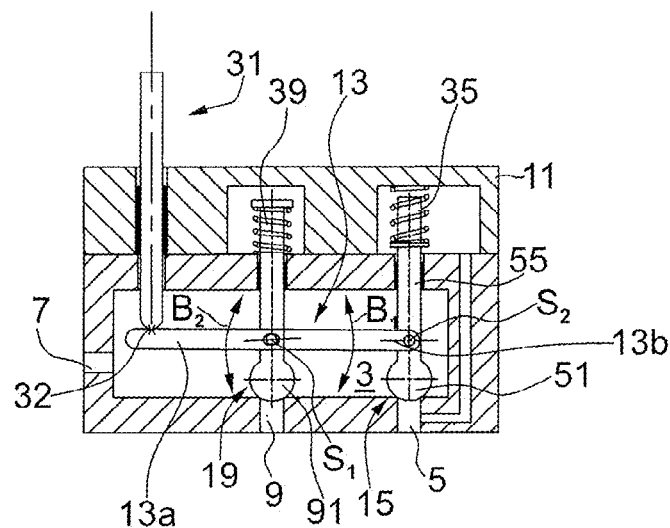
FIG. 4b shows the pneumatic valve arrangement of FIG. 4a in a pressure-constant holding condition, according to an embodiment.
Figure 4C:
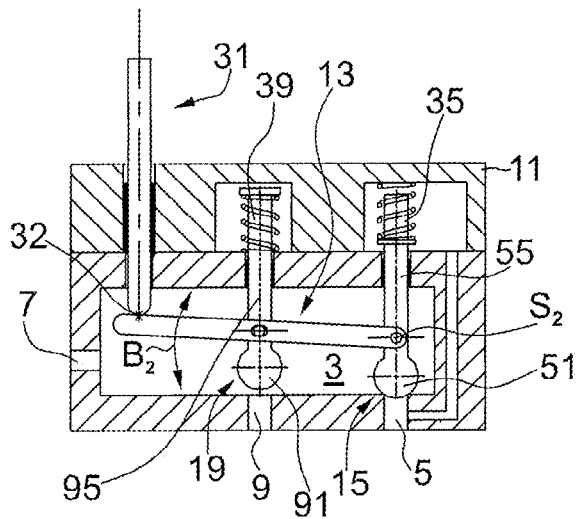
FIG. 4c shows the pneumatic valve arrangement of FIG. 4a in a venting condition, according to an embodiment.

The following text discusses in detail the example embodiments represented in FIGS. 4a, 4b and 4c.

The embodiments according to FIGS. 4a to 4c differ from the embodiments shown in FIGS. 3a to 3c essentially only in the integration of the actuating mechanism. As shown in FIGS. 3a to 3c, the control rod of actor 31 and the force input position 32 is arranged between aerating valve 15 and venting valve 19. FIGS. 4a to 4c show venting valve piston 95 arranged between the aerating valve piston 55 and the control rod of actor 31. The effective lever working length from the second pivot axis $S_2$ to the force input position 32 of actor 31 is thus equal to the combined lengths of lever arms 13a and 13b. The effective lever length of arm 13a about the first pivot axis $S_1$, which is fixed stationarily on the closed venting valve 19, provides a lever length between force input position 32 and pivot axis $S_1$ which is substantially exactly the same size as the effective length of lever arm 13b between pivot axis $S_1$ and aerating valve 15.

Figure 5A:
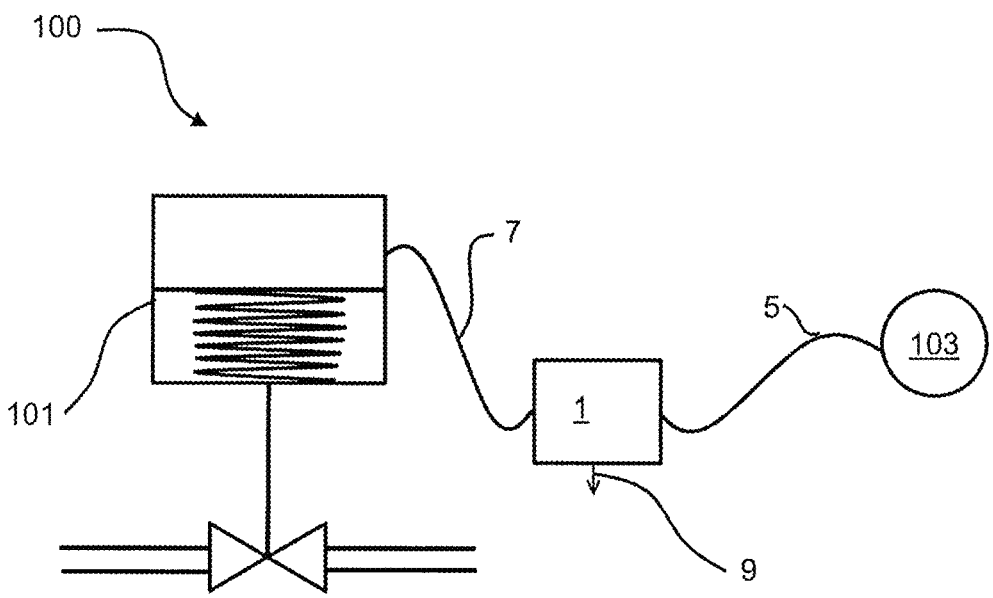
FIG. 5a shows a field device with a single-action pneumatic drive and a pneumatic valve arrangement, according to an embodiment.
Figure 5B:
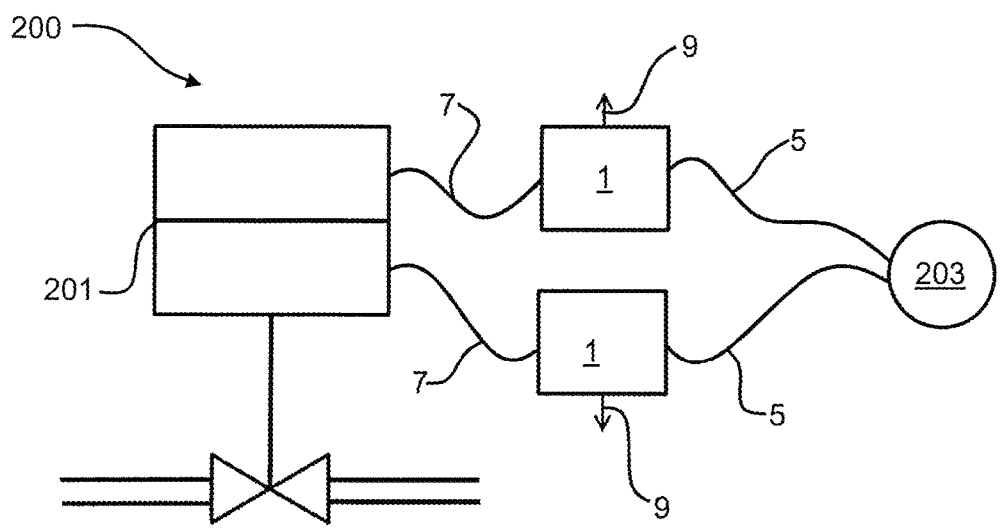
FIG. 5b shows a field device with a dual-action pneumatic drive and two pneumatic valve arrangements, according to an embodiment.

FIGS. 5a and 5b show different example embodiments of a pneumatically operated field device 100 or 200 including a pneumatic valve arrangement 1 which may be designed as described above, in accordance with one of the above embodiments. The field device 100 of FIG. 5a includes a pneumatic actor realized as a single-action pneumatic linear drive 101 with spring return which is in pneumatic communication with the control air conduit 7.

In FIG. 5b, the field device 200 includes a dual action pneumatic actuating drive 201 with a first pneumatic working chamber and a second pneumatic working chamber, which are pneumatically separated from each other and have opposite effective directions. The first drive chamber may be connected to the control air conduit 7 of a first pneumatic valve arrangement 1, and the second pneumatic working chamber may be connected to the control air conduit 7 of a different, second pneumatic valve arrangement 1.

The pneumatic actuating drive 101 or 201 has its pneumatic working chamber(s) connected with one respective pneumatic control inlet for increasing and/or lowering pressure. This singular pneumatic control inlet is connected to one respective control air conduit 7 of ether the first or second pneumatic valve arrangement 1. Either field device 100, 200 may further comprise a pneumatic source 103, 203 of pressurized air, such as a pressurized air tank, a compressor, a supply line or the like, which is connected pneumatically to the air supply conduit 5.

The various embodiments described herein may be significant both individually and in any combination for the purposes of facilitating the various functions associated with these embodiments.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein. In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 Pneumatic valve arrangement
3 Air chamber
5 Air supply conduit
7 Control air conduit
9 Venting conduit
11 Housing
13 Carrier lever
13a, 13b, 13c Lever arm
15 Aerating valve
19 Venting valve
21 Blade
23 Spring
31 Actor
32 Force input position
33 Pin
35, 39 Restoring spring
38 Dynamic actor seal
50, 90 Valve seat
51, 91 Valve member
53, 93 Sealing surface
55, 95 Piston
56, 96 Compensation duct
58, 98 Dynamic seal
100, 200 field device
101 single action-pneumatic linear drive
201 dual-action pneumatic actuating drive
103, 203 pressure source
atm Atmosphere
A Actor axis
B1, B2 Actuating movement
S1, S2 Pivot axis

The invention claimed is:

1. A pneumatic valve arrangement, comprising:
an air supply conduit configured to receive pressurized air from a pressurized air source;
a venting conduit configured to discharge the pressurized air to a pressure sink;
a venting valve configured to open and close the venting conduit;
an aerating valve configured to open and close the air supply conduit; and
a pivotable carrier lever configured to: actuate the aerating valve and the venting valve, hold the venting valve in its closed position while opening the aerating valve from its closed position, and provide a first rotational actuating movement to open the aerating valve while the venting valve is in the closed position, wherein:
the aerating valve and the venting valve are coupled together via the pivotable carrier lever,
the pivotable carrier lever is mounted to at least one of: (i) a stationary part of a housing of the pneumatic valve arrangement, (ii) the aerating valve, and (iii) the venting valve, and
the pivotable carrier lever is configured to rotate around (i) a first pivot axis associated with the first rotational actuating movement to open the aerating valve, and (ii) a second pivot axis associated with a second rotational actuating movement to close the venting valve, the second pivot axis being different than the first pivot axis.

2. The pneumatic valve arrangement of claim 1, further comprising:
a spring configured to bias the pivotable carrier lever against a counter bearing to provide the second rotational actuating movement to close the venting valve and to rotatably secure the pivotable carrier lever relative to the second pivot axis about the counter bearing.

3. The pneumatic valve arrangement of claim 2, wherein the first rotational actuator movement to open the venting valve around the first pivot axis releases a safety mechanism associated with the second pivot axis.

4. The pneumatic valve arrangement of claim 1, wherein a (i) first effective lever length between the first pivot axis and a force input position of the pivotable carrier lever, and (ii) a second effective level length between the second pivot axis and a force input position of the pivotable carrier lever is the same for the first rotational actuating movement and the second rotational actuating movement, respectively.

5. The pneumatic valve arrangement of claim 1, wherein (i) first effective lever length between the first pivot axis and a force input position of the pivotable carrier lever, and (ii) a second effective level length between the second pivot axis and a force input position of the pivotable carrier lever is different for the first rotational actuating movement and the second rotational actuating movement, respectively.

6. The pneumatic valve arrangement of claim 1, further comprising:
an actor is configured to operate the pneumatic valve arrangement,
wherein the pivotable carrier lever for the first rotational actuating movement and the second rotational actuating movement is operated by the actor, and
wherein the force input position of the actor to move the pivotable carrier lever in accordance with the first rotational actuating movement to open the aerating valve acts upon the venting valve in a closing-force-enhancing manner.

7. The pneumatic valve arrangement of claim 5, further comprising:
an actor is configured to operate the pneumatic valve arrangement,
wherein the actor is arranged on the outside of the stationary part of the housing of the pneumatic valve arrangement, the actor defining the force input position for operating the pivotable carrier lever outside the pneumatic valve arrangement in a region associated with a pressure sink, the area associated with the pressure sink being external to three air conduits and an air chamber associated with the pneumatic valve arrangement into which the three air conduits lead.

8. The pneumatic valve arrangement of claim 1, wherein the pivotable carrier lever is rigidly and integrally connected to a valve member of the aerating valve and to a valve member of the venting valve, the pivotable carrier lever being hingedly connected to the valve member of the aerating valve.

9. The pneumatic valve arrangement of claim 1, wherein the pivotable carrier lever is mounted in a fully floating manner relative to the housing of the pneumatic valve arrangement via a guide, the guide including at least one pin to guide the pivotable carrier lever.

10. The pneumatic valve arrangement of claim 1, wherein the pivotable carrier lever is mounted in a fully floating manner relative to the housing of the pneumatic valve arrangement via a guide, the guide including at least one interior side wall of an air chamber into which three air conduits lead that are associated with the pneumatic valve arrangement.

11. The pneumatic valve arrangement of claim 1, wherein:
the aerating valve includes a first valve member,
the venting valve includes a second valve member, and
the first valve member and the second valve member each has a sealing surface that is at least partially spherical.

12. The pneumatic valve arrangement of claim 11, wherein the first valve member and the second valve member is each made of hardened steel.

13. The pneumatic valve arrangement of claim 11, wherein the first valve member and the second valve member is each made of ceramic.

14. The pneumatic valve arrangement of claim 1, wherein the aerating valve is closed and the venting valve is opened when the pneumatic valve arrangement is in a non-actuated condition.

15. The pneumatic valve arrangement of claim 1, wherein:
the aerating valve is associated with a first pressure-force-compensation piston,
the venting valve is associated with a second pressure-force-compensation piston, and
the pressure first compensation piston and the second compensation piston each includes a seal.

16. The pneumatic valve arrangement of claim 1, wherein:
the aerating valve is associated with a first pressure-force-compensation piston,
the venting valve is associated with a second pressure-force-compensation piston, and
the pressure first compensation piston and the second compensation piston each includes a membrane.

17. The pneumatic valve arrangement of claim 1, further comprising a control air conduit configured to aerate and/or vent a pneumatic actor of the pneumatic valve arrangement.

* * * * *